M. O. & J. G. REHFUSS.
WRAPPING MACHINE.
APPLICATION FILED JUNE 30, 1914. RENEWED MAY 22, 1915.
1,164,548.
Patented Dec. 14, 1915.
7 SHEETS—SHEET 1.
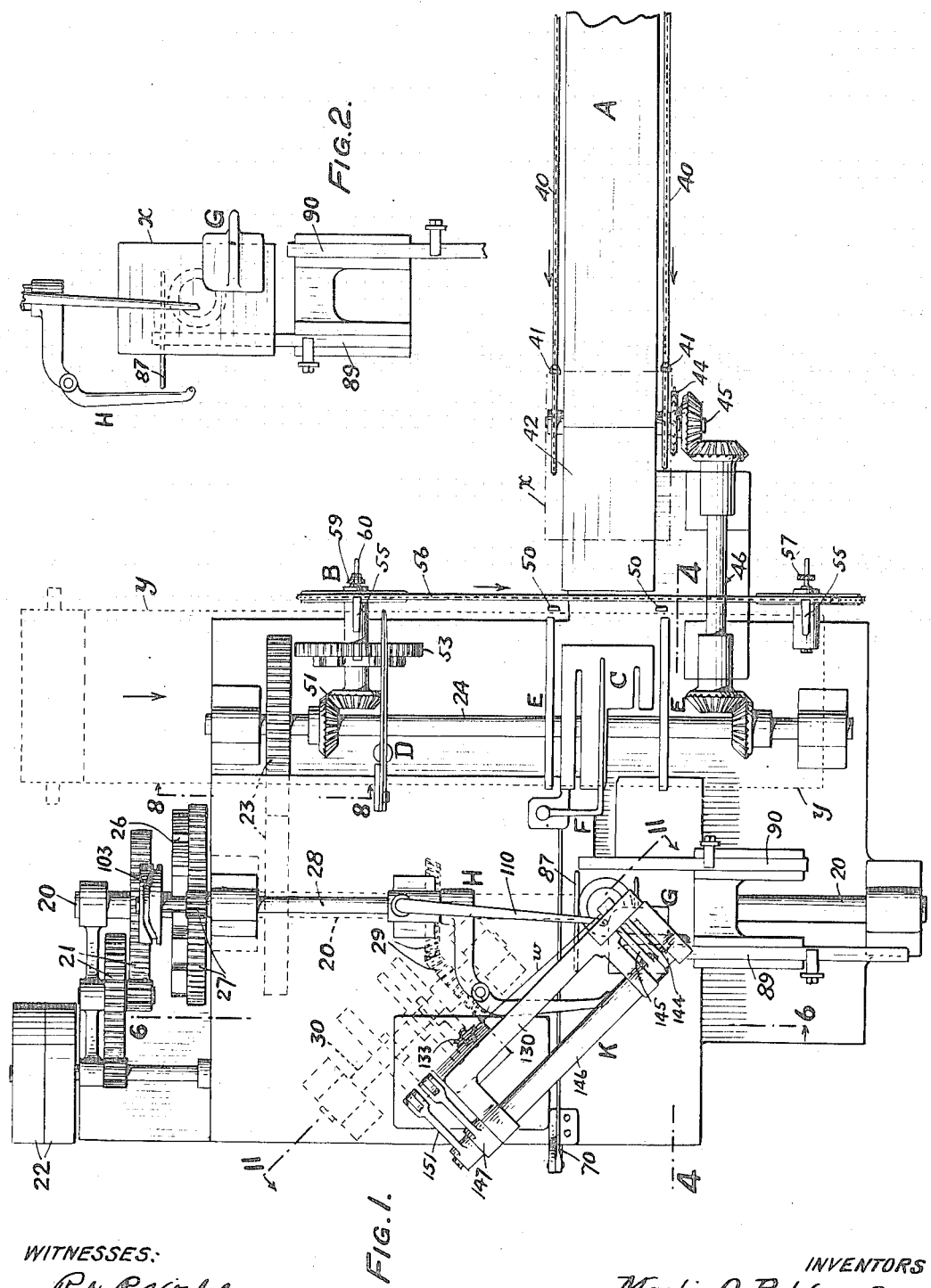
WITNESSES:
Rob R Kitchel
Frank E French
INVENTORS
Martin O. Rehfuss &
John George Rehfuss
BY
Augustus B Stoughton
ATTORNEY

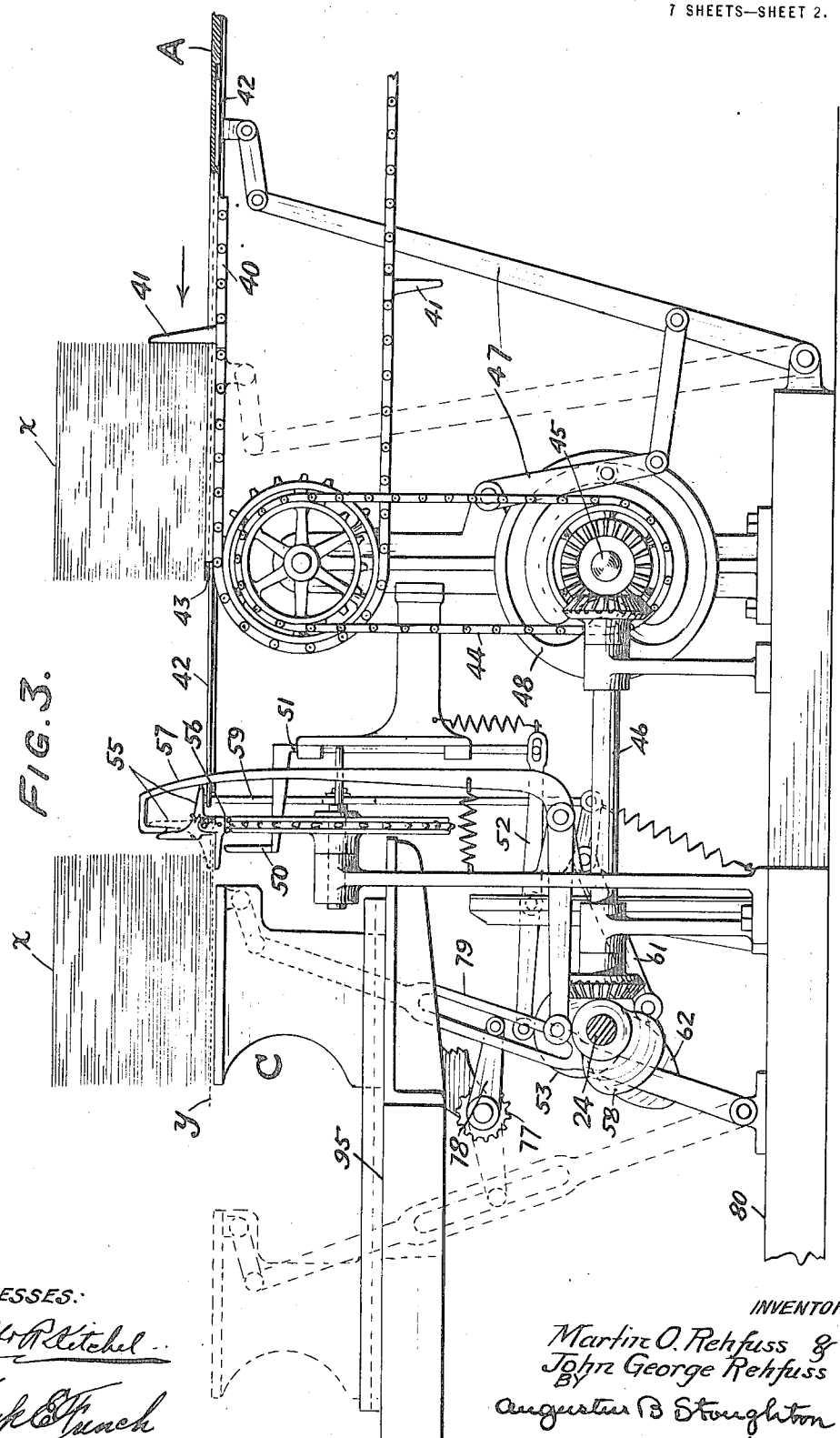

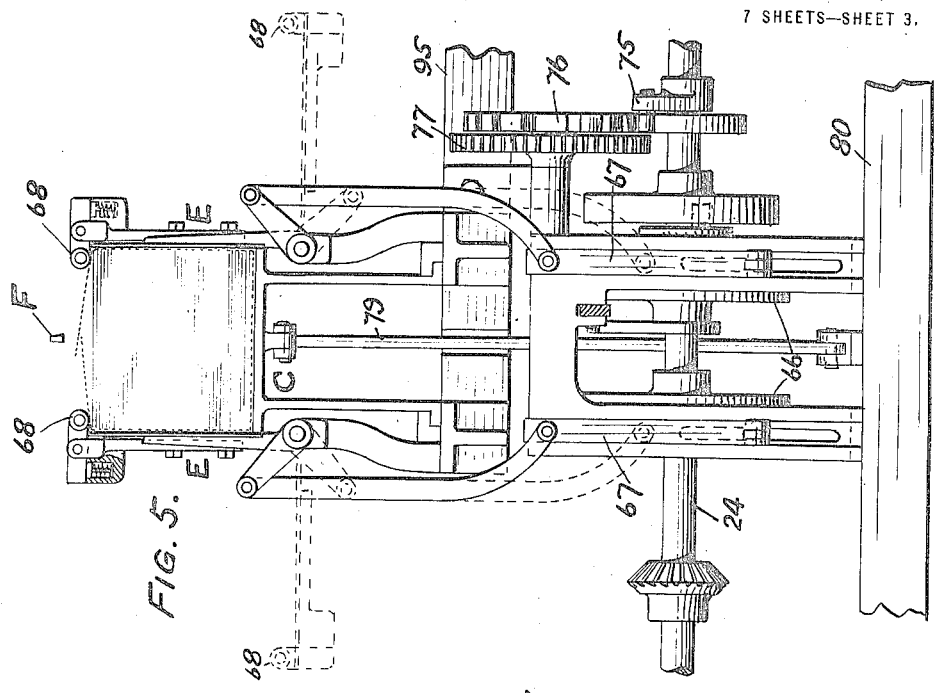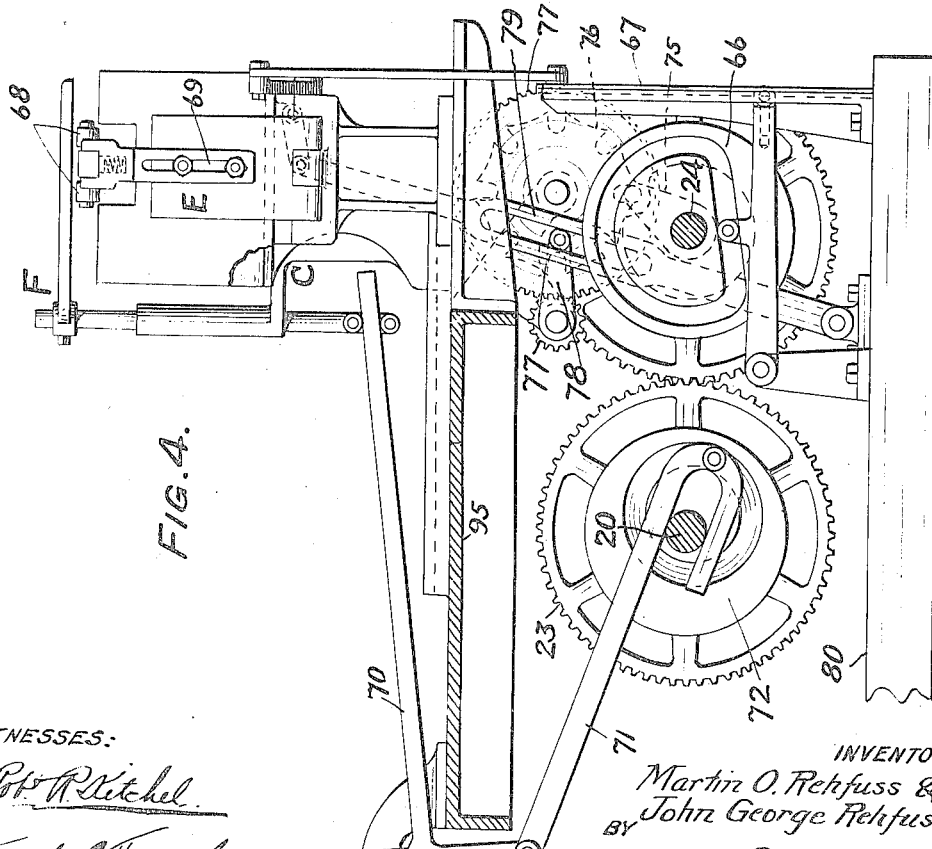

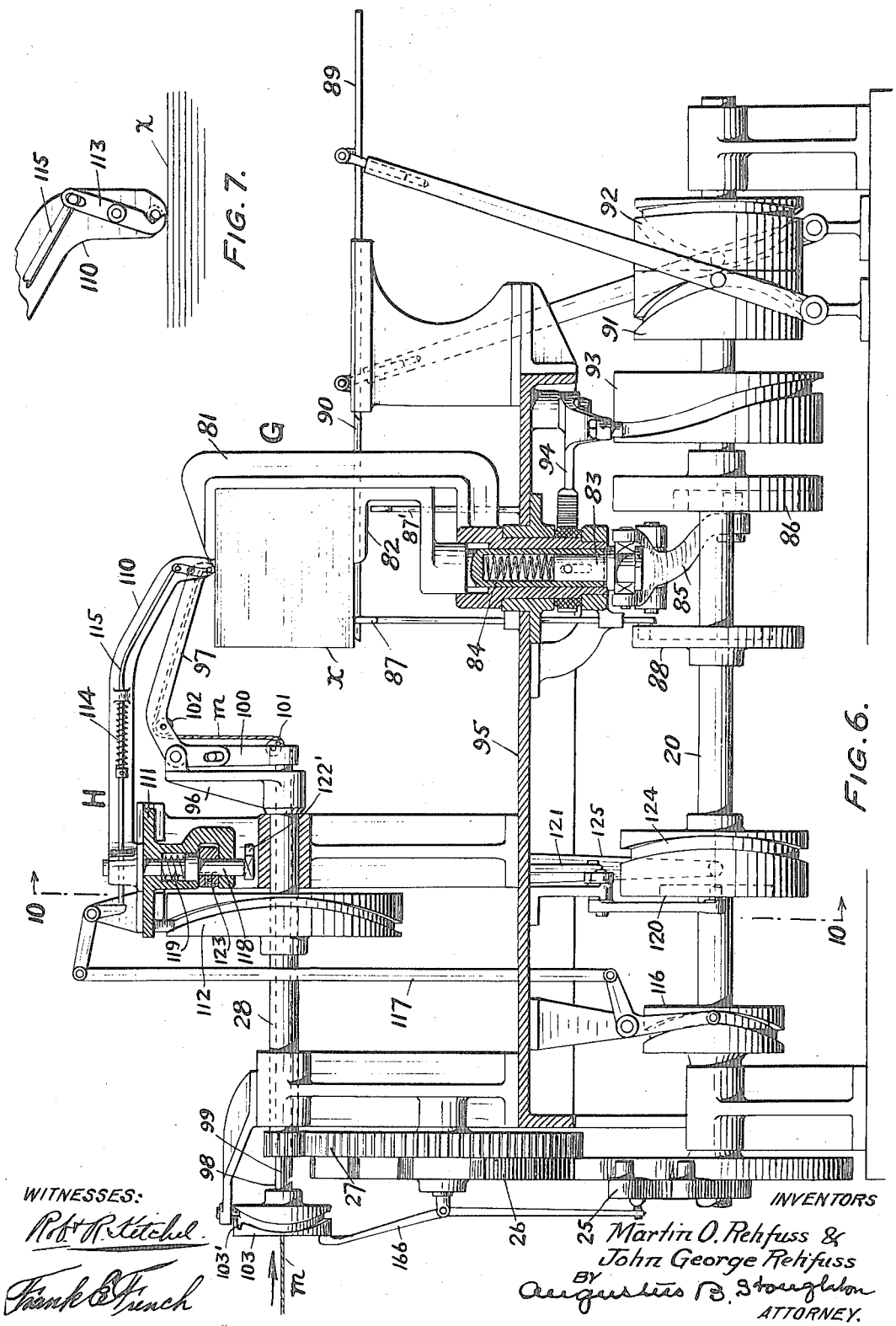

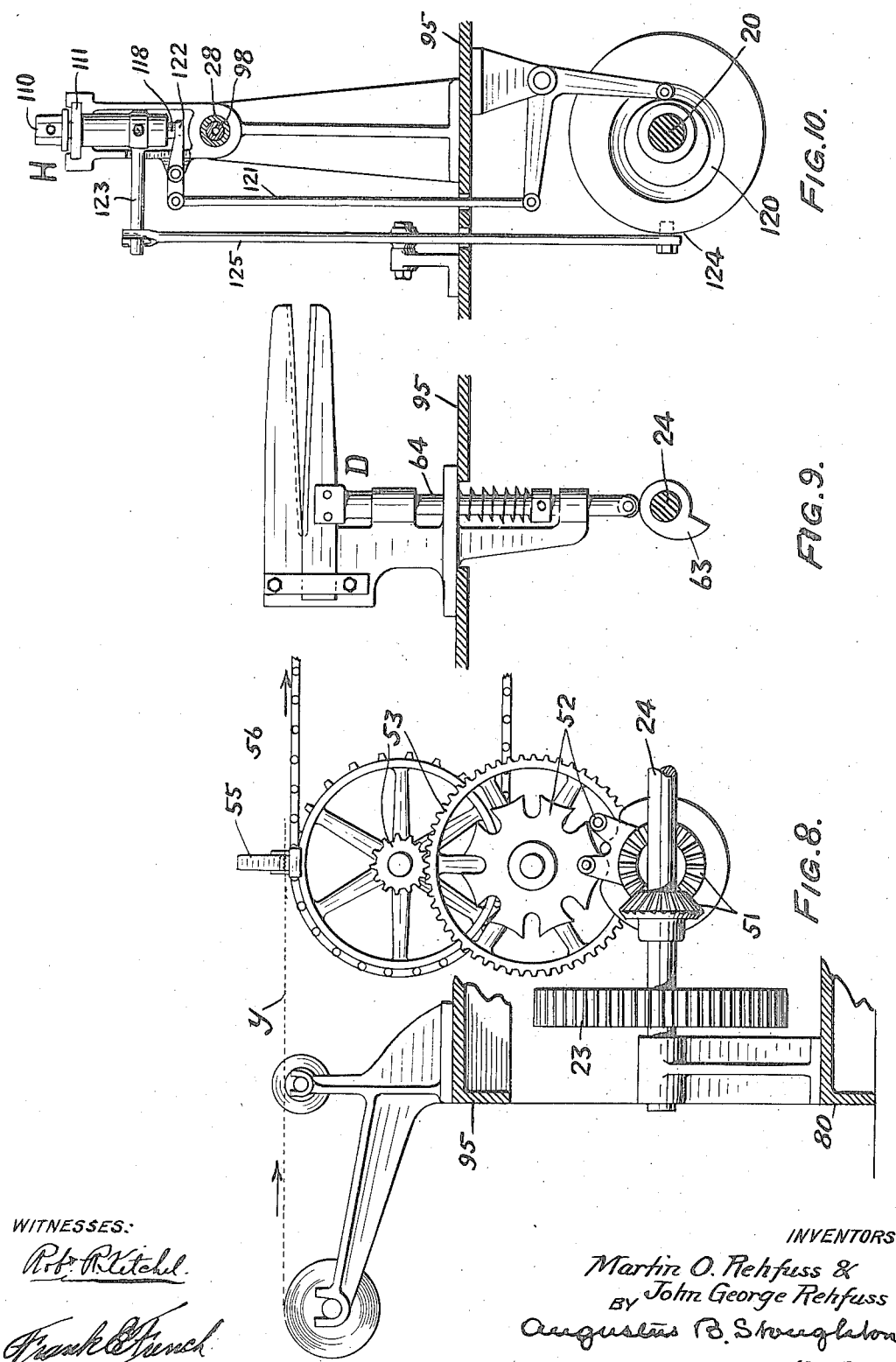

M. O. & J. G. REHFUSS.
WRAPPING MACHINE.
APPLICATION FILED JUNE 30, 1914. RENEWED MAY 22, 1915.

1,164,548.

Patented Dec. 14, 1915.
7 SHEETS—SHEET 7.

WITNESSES:

INVENTORS
Martin O. Rehfuss &
BY John George Rehfuss
Augustus B. Stoughton
ATTORNEY.

UNITED STATES PATENT OFFICE.

MARTIN O. REHFUSS AND JOHN GEORGE REHFUSS, OF PHILADELPHIA, PENNSYLVANIA, ASSIGNORS TO THE CURTIS PUBLISHING COMPANY, OF PHILADELPHIA, PENNSYLVANIA, A CORPORATION OF PENNSYLVANIA.

WRAPPING-MACHINE.

1,164,548.  Specification of Letters Patent.  Patented Dec. 14, 1915.

Application filed June 30, 1914, Serial No. 848,122. Renewed May 22, 1915. Serial No. 29,927.

*To all whom it may concern:*

Be it known that we, MARTIN O. REHFUSS and JOHN GEORGE REHFUSS, both citizens of the United States, and residents of Philadelphia, in the county of Philadelphia and State of Pennsylvania, have jointly invented a certain new and useful Wrapping-Machine, of which the following is a specification.

The principal object of the present invention is to provide a rapid, reliable and labor saving machine for automatically wrapping groups or piles of magazines, publications or the like, with paper and securing them into bundles or packages with reliably fastened string or twine.

Other objects of the invention will appear from the following description.

The invention will be hereinafter described and finally claimed, but it may be said that the invention is embodied in a machine comprising in combination the following instrumentalities or some of them: a carrier for feeding the piles of magazines or the like to the machine; a paper roll and feed therefor; a movable table for receiving first the paper and then the pile; paper cutting mechanism, folders for wrapping the paper about the pile, a presser for temporarily holding the folded paper in place, a clamping device, means for shifting the table to transfer the wrapped pile to the clamping device, cord winding mechanism, means for turning the clamping device and pile ninety degrees to permit of the winding of the cord in both directions, and a cord fastening and cutting device.

In the accompanying drawings is illustrated one embodiment of a machine embodying features of the invention.

Figure 11:
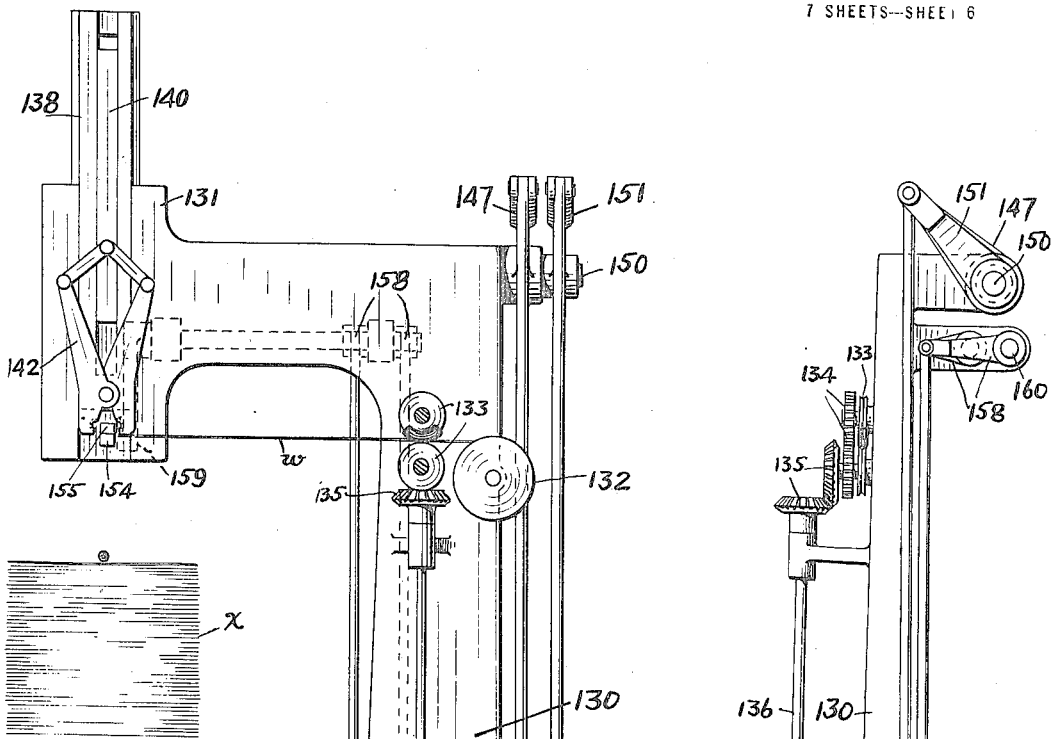
Figure 12:
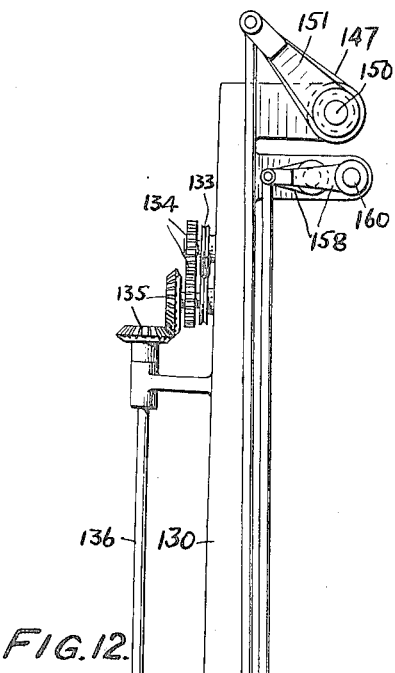
Figure 13:
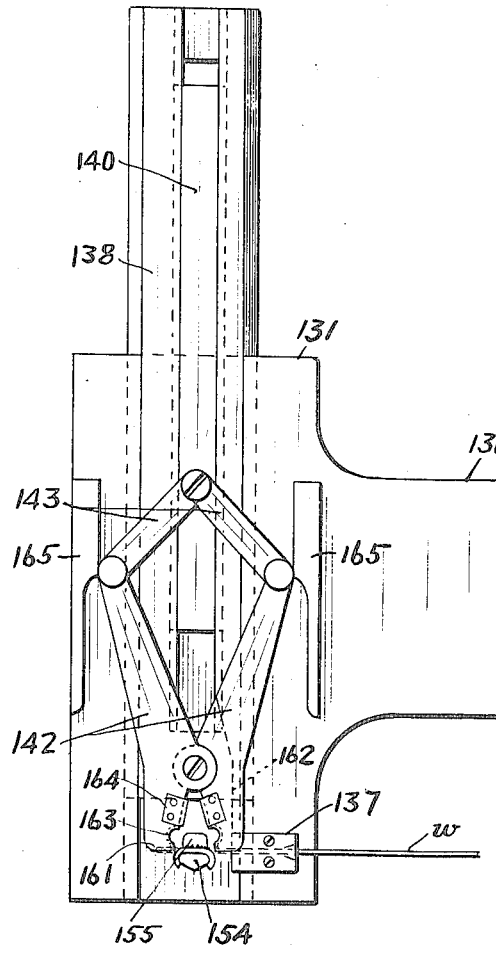
Figure 14:
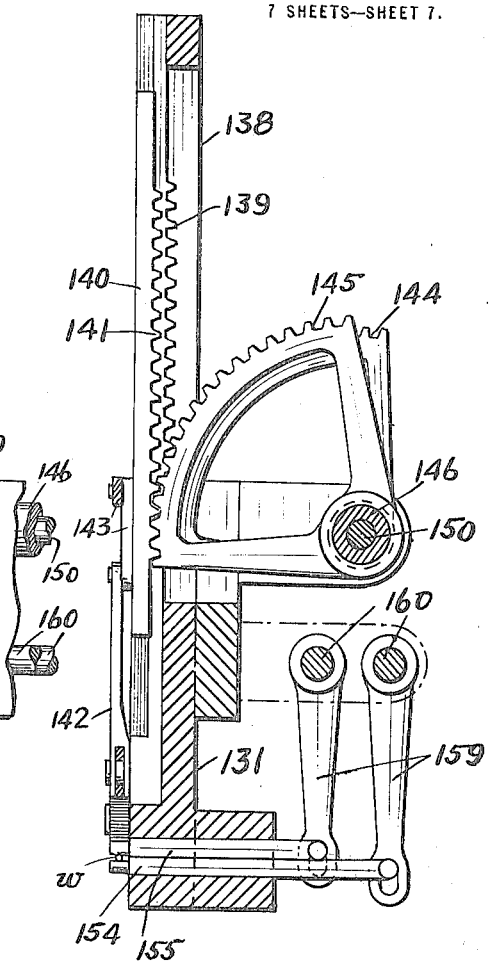
Figure 15:
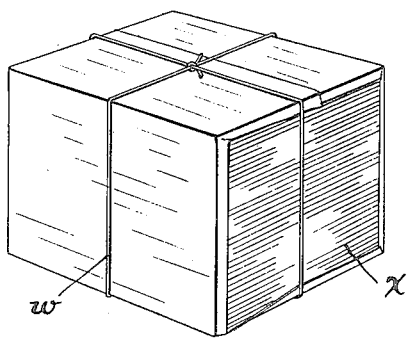

In the drawings, Figure 1, is a general plan view of the machine, in which the various functions are indicated in a more or less general way, to be more fully shown in individual detail figures. Fig. 2, is a fragmentary view of a portion of Fig. 1, shown in a different position. Fig. 3, is a partial front view of the machine. Fig. 4, is a section on line 4—4 of Fig. 1. Fig. 5, is a side view of Fig. 4. Fig. 6, is a section on line 6—6 of Fig. 1. Fig. 7, is an enlarged detail view of a portion of Fig. 6. Fig. 8, is a section on line 8—8 of Fig. 1. Fig. 9, is a section showing a front view of paper cutting mechanism. Fig. 10, is a section on line 10—10 of Fig. 6. Fig. 11, is a section on line 11—11 of Fig. 1, showing wire fastening mechanism. Fig. 12, is a side view of Fig. 11. Fig. 13, is an enlarged view of a portion of Fig. 11. Fig. 14, is a section showing side view of same, and Fig. 15, is a perspective view of the finished package.

It is believed that the invention can be best described by first referring to the principal parts of the machine and stating what they do, and then explaining in detail the various features of construction, and that course will be followed.

Referring to the general view, Fig. 1, the piles $x$ each consisting of a number of books, publications or the like, are placed at intervals upon the fixed slide A, and the wrapping paper $y$ is placed in the grippers of the paper feed mechanism B. Paper is carried by an intermittent motion in the direction of the arrows, over the movable slotted table C a sufficient distance. Then the feed from the slide A, deposits a pile upon it and the paper is cut off by cutter D. The feed gripper, which holds the paper is then released, and folder mechanism E E wraps the paper about the pile and a presser foot F descends and holds it in place. The folders are then retracted, and the table carrying the wrapped pile and the presser foot which holds, is moved to the left into position in clamp G. This clamp is now operated, securely holding the package during the winding operation, presser F is released, and with table C returned to their former position to receive succeeding piles and repeat operations. Clamping device G now by a partial rotation turns the package ninety degrees into position shown in Fig. 2, and cord winder H, by describing a proper path, puts a turn of cord once around the package. The clamping device turns to its former position and the cord winder operates again to put a turn of cord about the package, which is therefore now wound in both directions, and the cord winder holds both ends of cord crossed on top of package. Fastening device K now operates, making a clip from a wire and its arm descending upon the crossed cords and places over their intersection the previously made wire clip which holds them securely, thereafter cutting the cord. The winder releases its cord end, and clamping device is released, leaving a wrapped, bound and fastened package which may be pushed from the machine by the next succeeding wrapped package.

The machine is driven as follows, see Figs. 1 and 6: A main shaft 20 is driven through speed reducing gear 21, from the fast and loose pulleys 22. Gears 23 transmit motion from shaft 20 to shaft 24 which operates the feed mechanisms and paper cutter. Shaft 20 also carries roller 25 co-acting with star-wheel 26, which through gears 27 gives an intermittent motion to the hollow shaft 28 which operates the cord winding mechanism H. Bevel gears 29 transmit power from main shaft 20 to a shaft 30, placed at an angle of 45°, which operates the making and placing of the wire clips for fastening the cord, after winding.

Having thus described the general operation of the machine and method of driving, a further explanation of the construction by which the various movements are obtained will be given.

Having regard to Fig. 1, and referring more especially to Fig. 3, A is the fixed slide way upon which the piles of magazines or other matter are deposited. 40 are endless chain carriers provided with fingers 41, appropriately spaced, for engaging the rear of the piles on either side of the slide-way and carrying them toward the machine table until the pile is, by dropping, deposited on the movable slide 42 beyond the cross-cleat 43, thereon. Carriers 40 are driven by means of chain 44, shaft 45 and counter-shaft 46 from shaft 24 by means of bevel gears as shown. Movable slide 42 is supported in ways on fixed slide A and is reciprocated by links and levers 47 actuated by a cam 48 on shaft 45. Wrapping paper $y$, is caught in one of the spring closed grippers 55, carried by the paper feed chain 56, as hereinafter described, and is drawn over the movable slotted table C to receive and underlie the pile to be wrapped. The pile having been moved onto slide 42, cam 48 is so timed as to carry this slide forward at once, away from fingers 41, until the pile is directly over table C, with the wrapping paper between. At this instant strippers 50, carried from a slide 51 are projected upward behind the pile by means of spring actuated lever 52. Cam 48 continuing its rotation, withdraws slide 42, leaving the pile upon the paper on table C and strippers 50 descend at once out of action by means of cam 53 acting on lever 52. During this operation the above mentioned paper gripper 55, shown in dotted lines in Fig. 3, has moved forward to a position to be acted upon by spring and cam actuated lever 57, whose cam 58 now acts to open said gripper and release the paper. By this time a second paper gripper 55, so spaced on the carrier as to be in line with its actuating rod 59, and shown in full lines, has been snapped shut gripping the paper behind the line of cutters D. Rod 59 which is slotted midway and slides on a projection 60, is actuated by lever 61, carrying a roller which co-acts with a cam 62 on shaft 24.

Wrapping paper $y$ is fed in the following manner, see Fig. 8: Bevel gears 51 transmit motion from the constantly rotating shaft 24 to a roller and star-wheel device 52, which is connected by gearing 53 with the driving sprocket of chain 56. By this means chain 56 carrying the paper grippers 55 is moved periodically to bring each gripper in turn from the line of its rear actuating rod 59 to the line of the front actuating lever 57 see Fig. 1. As soon as the rear gripper grasps the paper, a cam 63 on shaft 24, see Fig. 9, actuates the spring pressed rods 64 raising the movable shear of cutters D and cuts off the paper. The folders E have during this time been lying out of action as shown in dotted lines in Fig. 5. As soon as the paper has been cut off and the front grippers have been opened, cams 66 on shaft 24 act to raise slides 67 and thereby swing the folders up into the vertical position, folding the paper about the pile. Spring pressed rollers 68 at the ends of the folders insure the folding down of the ends of the paper on top of the pile, and allow for slight variations in the height of the piles caused, for example, by differences in thickness of books or changes in the number of books. The piles are approximately of a given height, and these rollers 68 are adjusted accordingly by slot and bolt connections 69 to the folders. Cams 66 are similar and placed one slightly ahead of the other so that the folders may not act at exactly the same time, thereby preventing the ends of the paper as they fold in from interfering with each other. Presser arm F is now actuated by bell crank lever 70, hook arm 71, and cam 72 on shaft 20. By this means presser F is brought down firmly upon the lapped ends of the paper on top of the pile, and the folders E are withdrawn out of action by the cams 66. Table C is now moved to shift the wrapped pile to the clamping device or chuck G, as follows: On shaft 24 is an arm 75, shown in dotted lines in Fig. 4, carrying a roller which actuates a star-wheel 76, which by means of gearing 77, is arranged to give a crank arm 78 a half revolution. This crank arm carries a roller which slides in a slot in a lever 79, pivoted to the base plate 80 of the machine, and connected at its upper end by a short link with table C. This half revolution of crank 78 from the position shown in full lines to that shown in dotted lines, Fig. 3, moves table C to a position where the center of the wrapped pile thereon is directly over the turning center of the clamping device G. This device, see Fig. 6, comprises a turnable member 81 carrying a sliding jaw 82, which at this stage of the operation is retracted downwardly out of action. Jaw 82 is carried on a hollow post mounted on a stud 83 with a pin and slot connection, and normally upheld therefrom by a spring 84. This allows not only for slight variations in the height of the package, but also for packages of substantially different heights, similar to the adjustment allowed for on the folder rollers. The movable jaw 82 is now moved upward to clamp the package by means of bell crank lever 85 operated by cam 86 on shaft 20. Cam 72 now acts to raise the long arm of bell crank lever 70, thereby raising pressure arm F and table C is returned to its initial position by crank 78 making another half stroke due to star-wheel 76 and roller 75. The paper feed at once operates to draw another length of paper over the table on which is deposited another pile from slide A, and the cycle of operations is repeated. Meanwhile the package we have been describing was left by the removal of table C held in clamping device G. This clamp is shaped to cover a little less than one-quarter the area of the package in order to allow of the winding operation to follow. In order to more fully support the package a rail 87 is brought up into action by means of a cam 88, just before the table was moved away. 87′ is a fixed rail placed at the height of jaw 82 when open for supporting the end of the pile when table is retracted, slots being provided in the table for the projection of said rails therethrough. There are also supporting bars 89 and 90 actuated by cams 91 and 92 to support the overhanging portions of the package on either side of clamping device G. At this time, bar 90 is retracted by cam 92, clamp G is turned 90° into position shown in Fig. 2, by cam 93 and bell crank segment, and pinion 94, and bar 89 is extended under the pile, as shown in Fig. 2. Supporting rail 87 is now lowered out of action while winder H wraps a length of the cord $m$ once around the package crosswise, by means hereafter to be described. Clamp G now turns to its original position carrying the package still clamped in its jaws, supporting bar 89 being retracted and bar 90 again projected out under the pile. In this position winder H puts the cord again around the package, this time in its lengthwise direction, rail 87 being momentarily lowered by its cam 88 out the way of winder H at each revolution thereof. The winder is operated in the following manner: A description has been given of the shaft 28, revolved intermittently by star-wheel 26. This shaft is carried in bearings supported from the table 95 of the machine and has on its inner end an arm 96 to which is pivoted the cord winding arm 97. Shaft 28 is hollow and has slidable lengthwise within it the shaft 98 on a feather 99. Shaft 98 carries on its inner end an arm 100 which makes slot and pin connection with an end of the cord winding arm 97. The cord $m$ is threaded lengthwise through a hole running through shaft 98, to the inner end thereof, over pulley 101, led at right angles out to a pulley 102 on the winding arm and thence led through the length of the long arm of 97 and delivered through a hole at the end thereof. It will be readily seen that the intermittent revolution of shaft 28 periodically revolves winding arm 97 about the axis of said shaft. The projecting end of the cord being caught fast in holder 110, to be hereinafter described, this revolution of arm 97, draws in the cord $m$ and lays it around the package, cam 103, on shaft 98 acting through the slot and pin connection of arm 100 with winding arm 97 to make the cord delivery end thereof follow the rectangular path necessary in circumscribing the package. Each time the winding arm makes a revolution, arm 110 of holder H has to be momentarily moved out of its path, which is accomplished as follows: Arm 110 is mounted in a slide 111 carried above one of the bearing brackets of shaft 28, see Figs. 6 and 10. This slide is actuated by a cam 112, on shaft 28, so that at the required instant arm 110 is advanced forward beyond the path of the cord carrying arm allowing said arm to pass and complete its revolution. The end of cord $m$ projecting from the end of arm 97 is originally threaded through a hole in the end of holding arm 110 and held therein by a small clamping lever 113 operated by a spring 114 on rod 115. When it is desired to drop the end of the cord at the end of the winding and fastening operation, clamping bar 113 is opened by means of a cam 116 on main shaft 20 acting through bell cranks and link 117 upon the free end of rod 115. After the first winding of cord has been put around the packages, when it is turned 90° by the clamping mechanism, it is necessary to raise holding arm 110 slightly above the package to clear the cord. To this end arm 110 is not mounted rigidly on the slide 111, but by means of a pin or stud 118, which stud passes downwardly through said slide and is capable of vertical movement. A spring 119 normally holds said stud and cord holding arm in lowest position, but at the time it is necessary to raise to clear cord, a cam 120, see Fig. 10, actuates bell crank and link 121 to raise the free end of a lever 122, which lies directly below the stud 118. The free end of this lever has furthermore a side projection 122′ thereon, to allow for the above described sliding movement given to the holder, so that stud 118 may not pass off the end of lever 122 upon which it rests. Finally, besides a forward sliding motion and a lifting motion, the holder arm 110 must at times be given a turning movement. Normally as shown in Fig. 1, the end of the holder arm lies to one side of the center of the package, but after every package is finished off in the machine and cord is cut, the end left projecting from the hole in end of winding arm must be threaded into the hole in end of holder arm as hereinafter to be described. To this end holder arm must be turned on its supporting post 118 to bring its free end over center of package against the end of winding arm 97. This result is obtained by an arm 123 fastened to the supporting stud 118 of the holder arm, by a set screw and keyway which allows said stud to have its free vertical movement. Arm 123 is actuated at the proper moment by a cam 124 on shaft 20 acting through lever 125. As shown, cams 120 and 124 are combined on the same drum. Having now put two laps of cord about the package at right angles to each other, and drawn the ends slightly apart on either side of the crossing, there are then three strands of cord to be fastened off, which is done by placing a wire clip firmly and tightly about them. For the details of this fastening device K, see Figs. 11, 12, 13 and 14, together with Fig. 1.

On the table 95 of the machine is secured a stand 130 with an overhanging arm carrying a head 131 directly above the center of the package as it finally rests ready bound in the clamping mechanism G. Stand 130 carries reel 132 of wire $w$ for forming the cord fastening or clip. The wire is fed by feed rolls 133, connected by gears 134, which receive motion from shaft 30 by bevel gears 135 and 135' and vertical shaft 136. One of these feed rolls, the upper one as shown in Fig. 11, has not a complete peripheral bearing on the wire, the section which coacts with the lower roll being made to feed the wire at just the proper time and just the proper amount. As shown in Fig. 13, the wire is fed into the beveled opening of a hole through a block 137 secured to the head 131.

Movable vertically in head 131 is a slide 138 carrying on its rear face a rack 139. Slide 138 carries ways for a secondary slide 140 which has on its rear face a rack 141 arranged to one side of rack 139. Slide 138 carries the pivot joint of a pair of arms 143 which actuate said nippers. Slides 138 and 140 are actuated by their racks 139 and 141 engaging the toothed quadrants 144 and 145 mounted on concentric shafts carried in bearings on the rear of stand 130. Quadrant 145 is mounted on the hollow shaft 146 which carries at its opposite end arm 147 actuated by rod and lever 148 from a cam 149 on shaft 30. Quadrant 144 is mounted on shaft 150 which passes through shaft 146 as a bearing and carries on its opposite end arm 151. Arm 151 is actuated in a similar manner to arm 147 by means of rod and lever 152 from a cam 153, which as shown is made on the same disk with cam 149.

154 and 155 are slides which carry on their forward ends respectively a former and a gripper for wire $w$. These slides move the former and gripper into and out of action at desired times by means of cams 156, rods and levers 157, and levers 158 and 159 on shafts 160 carried in bearings on the stand 130.

So long as the cams 149 and 153 move the vertical slides 138 and 140 exactly together there will be no opening or closing of the nippers. Said nippers are shown in Fig. 13, as in their uppermost position, and as seen their bottom line comes exactly at the level of the center of the wire. These ends are in fact grooved to receive the upper half section of wire and the groove in the left hand nipper member terminates abruptly midway as at 161 forming a stop for the advancing wire as fed through the block 137.

At the time the wire is fed in, slide 154 is in its forward position and the former on its end helps to support the wire end and hold it against stop 161. Slide 155 then moves into its forward position, shown in Fig. 14, the serrations on its face sliding over the wire and being slightly beveled hold it down against the former. Cams 149 and 153 now act to bring slides 138 and 140 downwardly in unison. The right hand jaw of the nippers is slotted as at 162 to allow it to pass block 137 and form a cutting edge therewith. So the downward movement of the nippers cuts off the wire flush with the face of the block and the further movement bends the ends of the short piece of wire downwardly over the former and a slight acceleration being given to slide 140 by its cam, the nippers are partly closed, the rounded out notches 163 therein pressing the wire into the staple form shown in Fig. 13. The slides 154 and 155 are now withdrawn backwardly by their cams, and slides 138 and 140 descend in unison carrying the wire staple in the notches of the nipper jaws until said jaws reach the level of the top of the wrapped and bound package, indicated in Fig. 11. At this point, slide 140 is again accelerated by its cam, which closes the nipper jaws and presses the wire staple, which straddles the three strands of cord, into a ring form, clamping said strands firmly together. As seen in Fig. 1, the overhanging arm of stand 130 stands at an angle to the line of the package, and the descending slides and nippers place the wire staple catercornered over the intersection of the cord strands, insuring that it does not foul them. Also Fig. 1 shows that wire $w$ is delivered by feed rolls 133 at a slight angle to the line of the overhanging of stand 130. This slight angle is maintained by the hole in block 137, and it is just sufficient to provide the passage of the ends of the wire staple by each other in the formation of the ring or clip, allowing a tight clamp upon the cord.

164 are cutting members for the cord mounted on the nipper jaws. Before the final clamping movement of these jaws is completed the cord winding arm 97 is raised slightly by the action of a lever 166, see Fig. 6, actuated by a roller on its other end extending in the path of a cam-like projection on the revolving disk 25. At the proper point cam 103 is cut away as at 103′ for its pin to slip in and allow of the endwise motion of shaft 98, thus raising winding arm 97. This brings the cord carried thereby in between the cutting members, and the final clamping movement of the jaws cuts off the cord between the wire clip and the winding arm, leaving a short end of cord projecting from the latter. This short end is threaded again into the hole in the end of holding arm 110 and clamped there by arm 113, which clamp is opened as before described at the proper time. The winding arm drops again to its normal position and the holding arm is moved toward it by means of cam 123 and cam 124, as before described. The holes in the ends of these two arms are made to exactly aline and that in the holding arm is beveled on the side to receive the end of the cord projecting from the winding arm. 165 are guards on either side of the nippers 142, insuring that during the formation of the wire staple the nipper jaws follow the described path with nicety. As the slides 138 and 140 raise the nippers after this final cutting and clamping operation, the cycle of operation of the machine on the package is finished, and jaw 82 of the clamping device G is opened by cam 86, and rail 87 is lowered by its cam to keep the package level, allowing it to rest freely until it is bodily pushed out of the machine by the succeeding wrapped pile being carried to the clamp by table C. A chute or conveyer may be provided to receive the ejected packages.

It will be obvious to those skilled in the art that modifications may be made in details of construction and arrangement without departing from the spirit of the invention; hence we do not desire to limit the latter further than the prior state of the art and the appended claims may require.

We claim:

1. A machine for wrapping books and the like comprising the combination of a fixed slideway including feeding mechanism and upon which piles of books are placed, a turnable chuck or clamp spaced from the slide-way and adapted to hold and turn the wrapped piles, a table between the chuck and slide-way upon which the piles are wrapped and which is provided with a presser for holding the wrapped piles and which is movable in respect to the chuck or clamp for delivering wrapped piles to it, means for feeding paper from a roll across the table in sheet form, a slide movable in respect to the table and slide-way for transferring piles from the latter onto paper on the former, folders operatively arranged in respect to the table for folding paper around the pile and under the presser, cord winding mechanism including a cord carrying arm operatively arranged in respect to the chuck and adapted to describe a path around the package in each position thereof, mechanism for applying clips to the cord while the package is in the chuck, and means for actuating said parts, substantially as described.

2. A machine for wrapping books and the like comprising the combination of a fixed slide-way including feeding mechanism and upon which piles of books are placed, a turnable chuck or clamp spaced from the slide-way and adapted to hold and turn the wrapped piles, a table between the chuck and slide-way upon which the piles are wrapped and which is provided with a presser for holding the wrapped piles and which is movable in respect to the chuck or clamp for delivering wrapped piles to it, means for feeding paper from a roll across the table in sheet form, a slide movable in respect to the table and slide-way for transferring piles from the latter onto paper on the former, folders operatively arranged in respect to the table for folding paper around the pile and under the presser, cord winding mechanism including a cord carrying arm operatively arranged in respect to the chuck and adapted to describe a path around the package in each position thereof, mechanism for forming clips from a roll of wire and for applying the same to the cord while the package is in the chuck, and means for actuating said parts, substantially as described.

3. A machine for wrapping books and the like comprising the combination of a fixed slide-way including feeding mechanism and upon which piles of books are placed, a turnable chuck or clamp spaced from the slide-way and adapted to hold and turn the wrapped piles, a table between the chuck and slide-way upon which the piles are wrapped and which is provided with a presser for holding the wrapped piles and which is movable in respect to the chuck or clamp for delivering wrapped piles to it, strippers for holding the piles when the slide is retracted, means for feeding paper from a roll across the table in sheet form, a slide movable in respect to the table and slide-way for transferring piles from the latter onto paper on the former, folders operatively arranged in respect to the table for folding paper around the pile and under the presser, cord winding mechanism including a cord carrying arm operatively arranged in respect to the chuck and adapted to describe a path around the package in each position thereof, mechanism for applying clips to the cord while the package is in the chuck, and means for actuating said parts, substantially as described.

4. A machine for wrapping books and the like comprising the combination of a book feed, a movable wrapping table carrying a presser for holding the wrapped paper, means for feeding paper in sheet form to the wrapping table, devices for transferring the books from the book feed onto the top of the wrapping sheet on the wrapping table, paper folders for wrapping the paper onto the books and getting it beneath the presser, a chuck clamp to which the wrapped books are delivered by the movement of the table and its presser, cord carrying mechanism for winding cord around the package as presented by the chuck, clipping mechanism for fastening and cutting the cord, and means for operating said parts.

5. In a machine for wrapping books and the like the combination of a wrapping table, means for delivering paper in sheet form to the table, a book feeder, a device adapted to receive books from the feeder movably for projection and retraction over the table above the paper, a stripper for holding the books when the device is retracted to deposit the books on top of the paper, and means for actuating said parts.

6. In a machine for wrapping books and the like the combination of a movable wrapping table provided with a presser and upon which books are wrapped in paper which is held by the presser, a chuck or rotatable clamp to which the books are transferred by movement of the table and which is adapted to engage the books to present them in two positions for tying, and means for operating said parts.

7. In a machine for wrapping books and the like, the combination of a movable wrapping table provided with a presser and upon which books are wrapped in paper which is held by the presser, a chuck or rotatable clamp to which the books are transferred by movement of the table and which is adapted to engage the books at one side of each of their center lines to present them in two positions for tying, movable rails to support the parts of the books not held by the chuck and which are retracted and projected to clear the chuck, and means for operating said parts.

8. In a machine for wrapping books and the like the combination of a turnable clamp chuck for holding piles of books and presenting the same in different positions, a cord winder having a moving cord carrying arm adapted to describe a path into which a pile is presented in different positions, a clip device having mechanism for forming clips and applying them to the cord while the books are in the chuck, and means for actuating said parts.

9. In a machine for wrapping books and the like the combination of a turnable clamp chuck for holding piles of books and presenting a pile in different positions, a cord winder having a moving cord carrying arm adapted to describe a path into which the pile is presented in different positions, a clip device for applying clips to the cord and for cutting the latter while the bound pile is in the chuck, and means for actuating said parts.

10. In a machine for wrapping books and the like the combination of means for supporting a pile of books, a winding arm for winding a cord around said pile of books, means including a rotary member and an axially movable member for causing the operative end of the winding arm to describe a substantially rectilinear path around the pile and in proximity with one of its surfaces, and means for operating said parts.

11. In a machine for wrapping books and the like the combination of means for supporting a pile of books, a winding arm for winding a cord around said pile of books, means including a rotary member and an axially movable member for causing the operative end of the winding arm to describe a substantially rectilinear path around the pile and in proximity with one of its surfaces, devices for adjusting piles of books in said holding means so as to bring one surface thereof at the same level in respect to the winding arm in the case of piles of different thicknesses, and means for operating said parts.

In testimony whereof we have hereunto signed our names.

MARTIN O. REHFUSS.
JOHN GEORGE REHFUSS.

Witnesses:
CLIFFORD K. CASSEL,
FRANK E. FRENCH.